(12) United States Patent
Patra

(10) Patent No.: US 8,650,021 B2
(45) Date of Patent: Feb. 11, 2014

(54) PARALLEL FLIP-FLOP SETUP AND HOLD TIMING ANALYSIS

(75) Inventor: Kashuk Patra, San Jose, CA (US)

(73) Assignee: Oracle International Corporation, Redwood Shores ( * ) Notice: Subject to any disclaimer, the term of this patent is extended or adjusted under 35 U.S.C. 154(b) by 502 days.

(21) Appl. No.: 13/033,961

(22) Filed: Feb. 24, 2011

(65) Prior Publication Data

US 2012/0221313 A1 Aug. 30, 2012

(51) Int. Cl.
*G06F 17/50* (2006.01)

(52) U.S. Cl.
USPC .............................................. 703/19

(58) Field of Classification Search
None
See application file for complete search history.

(56) References Cited

U.S. PATENT DOCUMENTS

| | | | |
|---|---|---|---|
| 6,972,605 B1 | 12/2005 | Choe | |
| 7,075,336 B2 | 7/2006 | Kojima et al. | |
| 7,131,088 B2 | 10/2006 | Wei et al. | |
| 7,765,443 B1 * | 7/2010 | Syed et al. | 714/724 |
| 7,777,523 B1 | 8/2010 | Masleid et al. | |
| 7,834,663 B2 | 11/2010 | Wendell | |
| 2010/0052756 A1 | 3/2010 | Tang | |

OTHER PUBLICATIONS

"Timing analysis Using Bisection"; Avant?; Chapter 27; Star-Hspice Manual, Release 1998.2; pp. 27-1/27-18.

* cited by examiner

*Primary Examiner* — Saif Alhija
(74) *Attorney, Agent, or Firm* — Miles & Stockbridge P.C.

(57) ABSTRACT

A computer aided design system determines the acceptable timing for a flip-flop cell. The system generates a search window having a pass edge and a fail edge and divides the search window into four sections using three quadsection values. For each of the quadsection values, the system simulates a timing analysis of the flip-flop and determines if each of the quadsection values pass or fail the analysis. The analysis may be done in parallel. If at least one of the quadsection values passes the analysis, the system causes one of the passed quadsection values to be a new pass edge for the search window. If at least one of the quadsection values fails the analysis, the system causes one of the failed quadsection values to be a new fail edge for the search window. If the search window is less than a predetermined window width, the system assigns the new pass edge as the determined timing. If the search window is not less than the predetermined window width, the system repeats the above, starting with dividing the new search window into four sections using three quadsection values.

19 Claims, 4 Drawing Sheets

US 8,650,021 B2

PARALLEL FLIP-FLOP SETUP AND HOLD TIMING ANALYSIS

FIELD

One embodiment is directed generally to a computer system, and in particular to a parallel flip-flop setup and hold timing analysis using a computer aided design tool.

BACKGROUND INFORMATION

Electronic circuits are typically designed using computer aided design tool. These tools usually are centered around basic building blocks, called "cells", which represent logic (e.g., a NAND gate), and memory (e.g., a flip-flop). Timing considerations are paramount when designing complex circuits such as very large-scale integrated ("VLSI") circuits, which can be formed of many millions of cells.

Flip-flops, in particular, require timing considerations related to setup and hold times. The setup time is the minimum amount of time the data signal should be held steady before the clock event so that the data is reliably sampled by the clock. The hold time is the minimum amount of time the data signal should be held steady after the clock event so that the data is reliably sampled. Metastability in flip-flops can be avoided by ensuring that the data and control inputs are in accordance with the setup and hold times. These times are specified in the data sheet for the flip-flop, and are typically between a few nanoseconds and a few hundred picoseconds for modern devices. Computer aided design tools typically include analysis to determine if the setup and hold times are met in all conditions for all flip-flops in a circuit, in order to avoid timing issues.

SUMMARY

One embodiment is a computer aided design system that determines the acceptable timing for a flip-flop cell. The system generates a search window having a pass edge and a fail edge and divides the search window into four sections using three quadsection values. For each of the quadsection values, the system simulates a timing analysis of the flip-flop and determines if each of the quadsection values pass or fail the analysis. The analysis may be done in parallel. If at least one of the quadsection values passes the analysis, the system causes one of the passed quadsection values to be a new pass edge for the search window. If at least one of the quadsection values fails the analysis, the system causes one of the failed quadsection values to be a new fail edge for the search window. If the search window is less than a predetermined window width, the system assigns the new pass edge as the determined timing. If the search window is not less than the predetermined window width, the system repeats the above, starting with dividing the new search window into four sections using three quadsection values.

DETAILED DESCRIPTION

One embodiment is a computer system that performs setup and hold time analysis for a flip-flop using a quadsection methodology and parallel execution. This allows the analysis to converge quicker than known flip-flop setup and hold time analysis methods.

Figure 1:
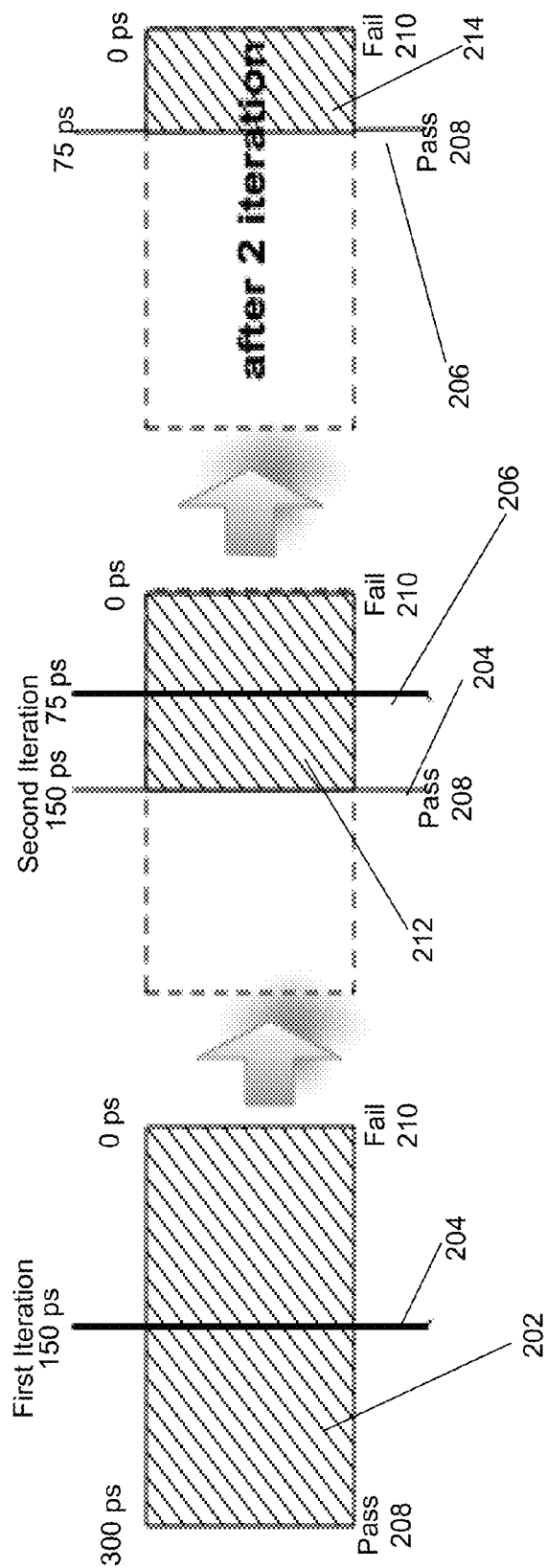
FIG. 1 is a block diagram illustrating the prior art bisection analysis.

Many computer aided design tools have computer simulation functions to perform setup and hold time analysis of all flip-flops in a circuit. One known methodology is the "bisection" analysis for determining the ideal setup or hold time (i.e., the minimum setup or hold time that will avoid metastability and an unpredictable output). FIG. 1 is a block diagram illustrating the prior art bisection analysis.

In the bisection analysis, for either a setup or hold time analysis, a search window 202 is formed having a width W. The "pass edge" 208 or pass boundary of window 202 has a time duration that clearly exceeds all minimum setup or hold times. In the example of FIG. 1, the pass edge time parameter is 300 ps, which would result in a long setup or hold time that ensures that the flip-flop has stabilized. The "fail edge" 210 or lower boundary of window 202 has a time duration that clearly fails the minimum setup and hold times, and which would result in the flip-flop failing to stabilize the input data before the clock transition. In the example, of FIG. 1, the fail edge time parameter is 0 ps. The bisection analysis further includes a target value, which is the ideal setup/hold time, and an error tolerance which specifies a solution arbitrarily close to the target value, since it is impractical if not impossible to find the exact value. The error tolerance specifies the acceptable final width of the window.

A bisection line 204 divides window 202 in half at 150 ps. The timing of bisection line 204 is then simulated/tested. If the timing passes (i.e., setup/hold times are satisfied), at the second iteration line 204 becomes the "new" pass edge 208, and another bisection line 206 bisects the "new" window 212 at 75 ps. However, if the timing of bisection line 204 fails, bisection line becomes the "new" fail edge and the window moves to the left.

New bisection line 206 is then simulated. If it passes, and the window is within the error tolerance, the analysis is done and bisection line 206 becomes the optimized setup/hold time. In the example of FIG. 1, bisection line 206 passes at the second iteration and the width of new window 214 is within the error tolerance and the bisection analysis is finished. However, the typical bisection analysis requires 12-20 iterations before the optimized setup/hold time is determined. Therefore, the bisection analysis requires a relatively large number of iterations to converge.

Figure 2:
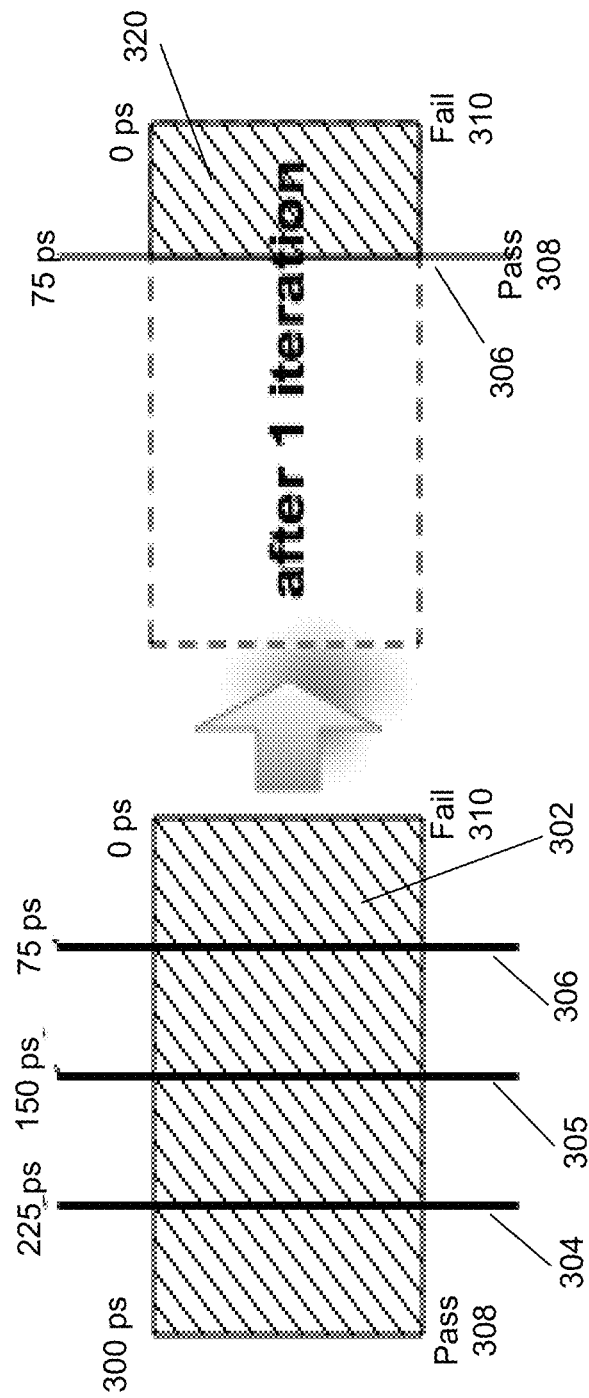
FIG. 2 is a block diagram illustrating the quadsection flip-flop setup/hold timing analysis in accordance to one embodiment.

FIG. 2 is a block diagram illustrating the quadsection flip-flop setup/hold timing analysis in accordance to one embodiment. In one embodiment, in general, instead of dividing the window in half and simulating a single bisection line, the window is divided in quarters, using three quadsection lines/values, and each of the three lines are simulated in parallel using multiple processors.

As shown in FIG. 2, the window 302 has a pass boundary or edge 308 at 300 ps and a fail boundary or edge 310 at 0 ps. Window 302 is divided into "quad" sections using quadsection lines 304-306 at 225 ps, 150 ps, and 75 ps, respectively. The setup or hold times are simulated at each of those values simultaneously or substantially simultaneously utilizing parallel processors. If all values pass, the pass edge is moved to the right most line (i.e., line 306), as is shown in the example of FIG. 2. The size of the new window 320 is then compared to an acceptable error criteria, or determined if it is less than a predetermined minimum window width. If it is, then the analysis is completed, as shown in FIG. 2. If not, the new window is again divided into four sections and the analysis continues. However, if all values fail, the fail edge is moved to the left most line (i.e., line 304). As disclosed in more detail below, if some values pass and some values fail, both the left edge and right edge may be moved to a quadsection line to form the new window As shown in the example of FIG. 2, the quadsection analysis is complete after one iteration. However, typically the quadsection analysis will take 6-10 iterations before convergence.

Figure 3:
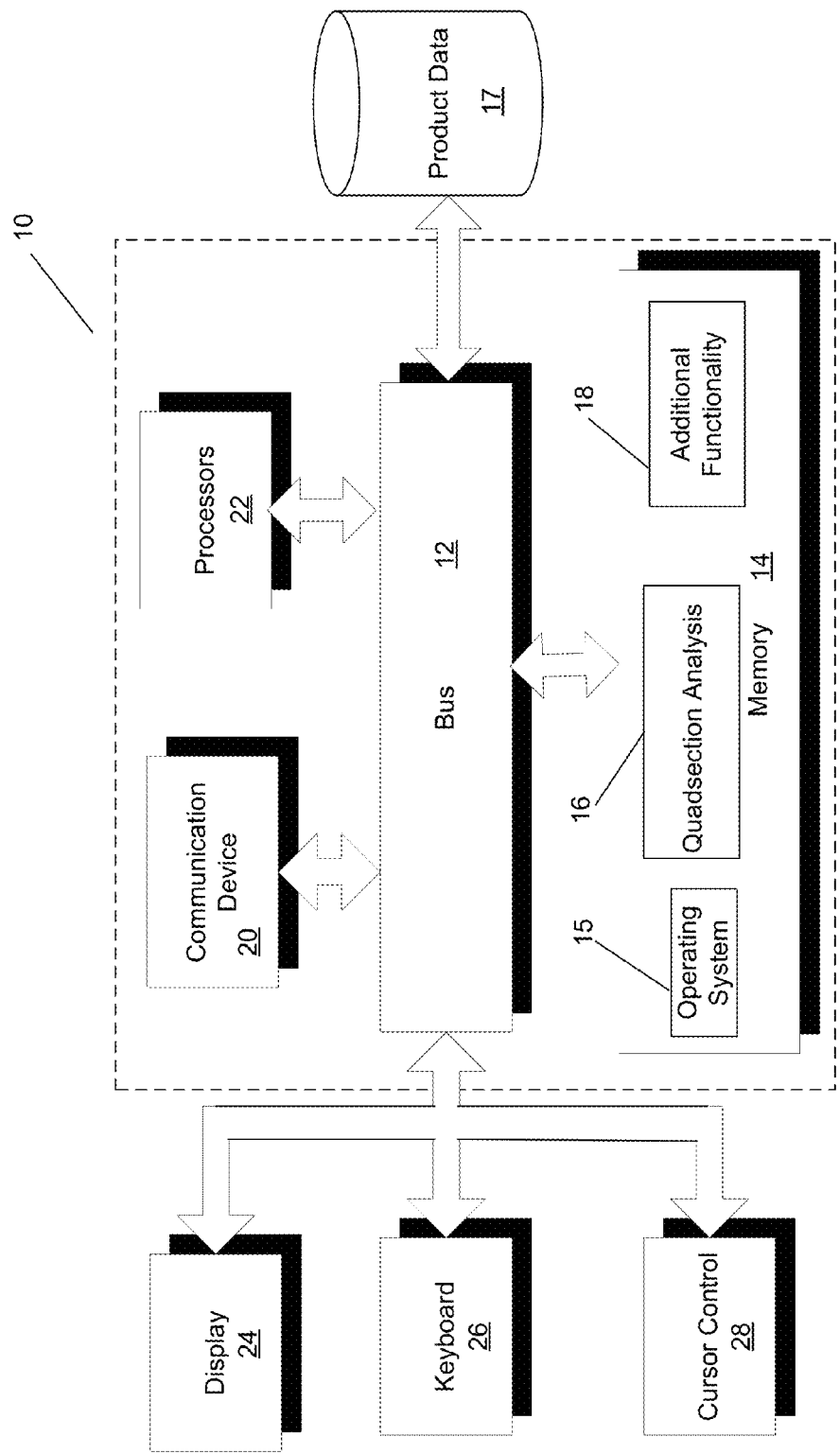
FIG. 3 is a block diagram of a computer system that can implement an embodiment of the present invention.

FIG. 3 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor capable of processing multiple instructions in parallel. In one embodiment, processor 22 is an individual multi-core processor, but may be implemented using multiple individual processors in communication with each other, or any other type of processor or processors that is capable of parallel computing.

System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a quadsection analysis module 16 that analyzes setup and hold times of flip-flops, as disclosed in more detail below. System 10 can be part of a larger system, such as an computer aided design tool system. Therefore, system 10 will typically include one or more additional functional modules 18 to include the additional functionality. A database 17 is coupled to bus 12 to provide centralized storage for modules 16 and 18 and store specifications for flip-flops and other memory or logic devices, circuit board specifications, etc.

Figure 4:
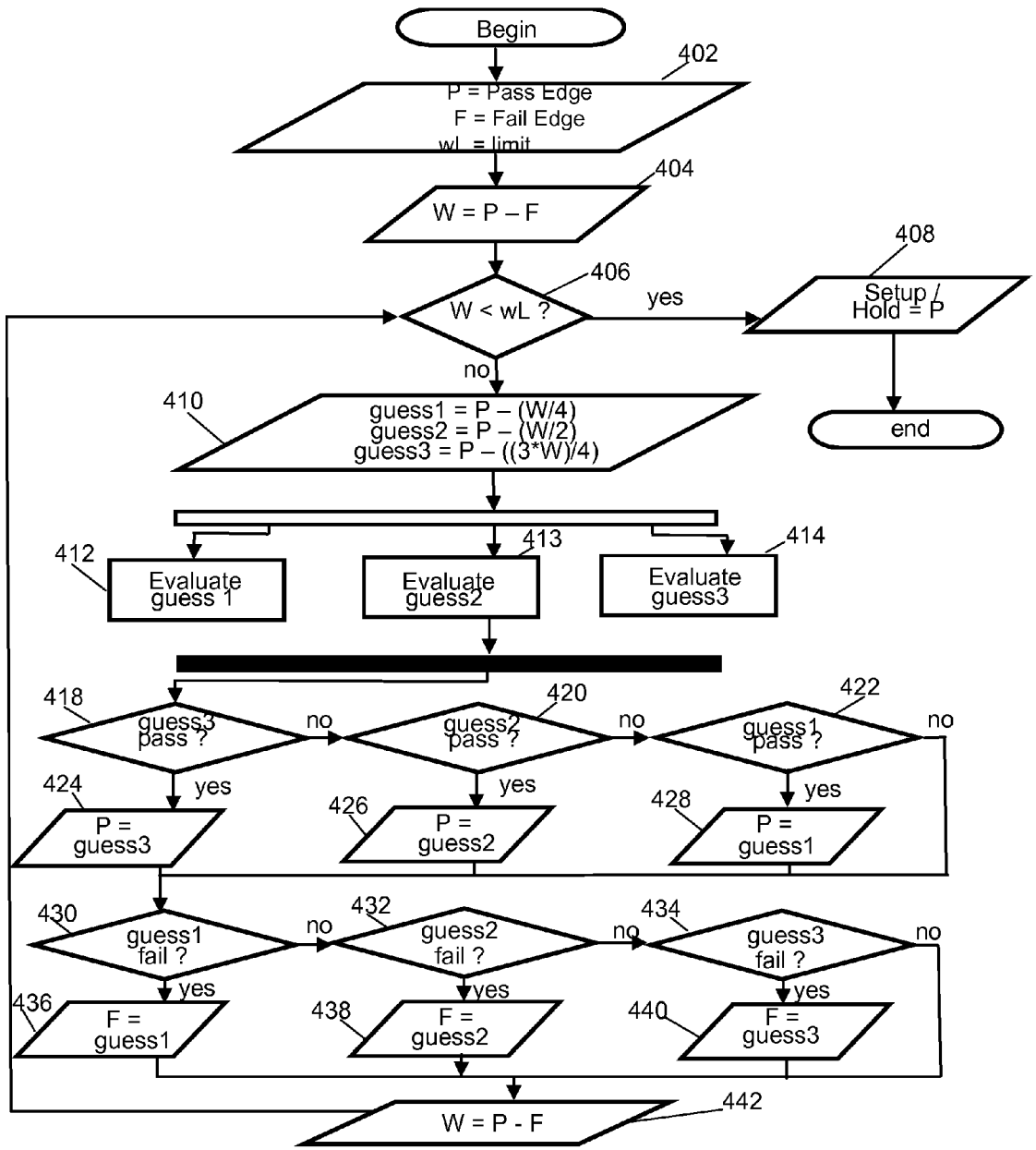
FIG. 4 is a flow diagram of the functionality of the quadsection analysis module of FIG. 3 when analyzing either the setup or hold time of a flip-flop in accordance with one embodiment.

FIG. 4 is a flow diagram of the functionality of quadsection analysis module 16 of FIG. 3 when analyzing either the setup or hold time of a flip-flop in accordance with one embodiment. In one embodiment, the functionality of the flow diagram of FIG. 4 is implemented by software stored in memory or other computer readable or tangible medium, and executed by a single processor or multiple processors in parallel. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, variables are assigned. "P" is the pass edge (e.g., pass edge 308 or the left side of window 302 of FIG. 2), which is the estimated/guessed setup/hold time for which the flip-flop operation passes (i.e., properly functions from a timing perspective). "F" is the fail edge (e.g., fail edge 310 or the right side of window 302 of FIG. 2), which is the estimated/guessed setup/hold time for which the flip-flop operation fails. "wL" is the limit, or the predetermined minimum pass-fail window width that is acceptable and which determines when the analysis will converge/end. In one embodiment, the predetermined window width is determined from the ideal setup/hold time and the error tolerance.

At 404, the window is generated, where "W", the width of the window, equals P-F.

At 406, it is determined if W is less than wL. If yes, the setup/hold time equals P and the functionality ends.

If no at 406, window W is divided into four equal portions using three quadsection lines, "guess1", which equals P−(W/4), "guess2", which equals P−(W/2), and "guess3", which equals P−((3*W)/4). Guess1, guess2 and guess3 are shown as lines 304-306, respectively, in FIG. 2.

At 412-414, guess1, guess2 and guess3 are evaluated/simulated simultaneously or substantially simultaneously in parallel using processor 22. A guess is evaluated by simulating its timing for the flip-flop being tested and determining if the setup or hold time (whichever is being tested for) has been adequately met so that the data is reliably sampled. The result of the evaluation is either a "pass" (i.e., the time is adequate) or a "fail" (i.e., the time is not adequate).

At 418, it is determined if guess3 passed. If yes, then at 424, P=guess3.

If no at 418, at 420 it is determined if guess2 passed. If yes, then at 426, P=guess2.

If no at 420, at 422 it is determined if guess1 passed. If yes, then at 428, P=guess1.

If no at 422, and after 424, 426 and 428, at 430 it is determined if guess1 failed. If yes, then at 436, F=guess1.

If no at 430, at 432 it is determined if guess2 failed. If yes, then at 438, F=guess2.

If no at 432, at 434 it is determined if guess3 failed. If yes, then at 440, F=guess3.

If no at 434, and after 436, 438 and 440, at 442 a new window is generated by making W=P−F. The functionality continues at 406 until the window width W is less then wL at 406. At this point, the analysis has converged, and the determined time is P at 408.

The following pseudo-code can be used to implement one embodiment:

```
P ← Guessed Setup/Hold time for which flop operation is OK;
F ← Guessed Setup/Hold time for which flop operation is not OK;
wL ← minimum pass-fail window width;
procedure quadSection(P,F,wL)
begin
    W ← P − F;
```

-continued

```
        while (W > wL)
        begin
                guess1 ← P − (W/4);
                guess2 ← P − (W/2);
                guess3 ← p − ((2*W)/3);
                Evaluate guess1, guess2, guess3
                        in parallel using simulation;
                if (guess3 is pass) then
                        P ← guess3;
                else if (guess2 is pass) then
                        P ← guess2;
                else if (guess1 is pass) then
                        P ← guess1;
                if (guess1 is fail) then
                        F ← guess1;
                else if (guess2 is fail) then
                        F ← guess2;
                else if (guess3 is fail) then
                        F ← guess3;
                W ← P − F;
        end
        return P;
end;
```

In general, using the quadsection analysis in accordance with embodiments results in a convergence to the final result (i.e., the optimized setup/hold time) approximately twice as fast as the prior art bisection analysis. This performance gain can be shown by assuming that the number of iterations in the prior art bisection analysis has a constant part "C" (to determine the given window is really a pass-fail window) and a dynamic part, which is determined by the initial window size "W" and the target resolution "R" (which determines the iteration stop condition). If the number of iterations to converge on the resultant window is "B", then B can be formulated as the following.

$$\frac{W}{2^B} \leq R \Rightarrow 2^B \geq \frac{W}{R} \Rightarrow B = \left\lceil \log_2 \frac{W}{R} \right\rceil \tag{1}$$

Therefore, the total number of iterations for the prior art bisection analysis is as follows:

$$N_b = C + \left\lceil \log_2 \frac{W}{R} \right\rceil \tag{2}$$

In contrast, the quadsection analysis in accordance with embodiments has the same constant part C. If the number of iterations on the resultant window is "Q", then Q can be formulated as follows:

$$\frac{W}{4^Q} \leq R \Rightarrow 2^{2Q} \geq \frac{W}{R} \Rightarrow Q = \left\lceil \frac{1}{2} \log_2 \frac{W}{R} \right\rceil \tag{3}$$

Therefore, the total number of iterations for the quadsection analysis is as follows:

$$N_q = C + \left\lceil \frac{1}{2} \log_2 \frac{W}{R} \right\rceil \tag{4}$$

From a comparison of equations (1) and (3) above, the convergence using quadsection analysis is twice as fast as the bisection analysis. It is also useful to determine how much extra simulations are needed for the quadsection analysis in order to determine how much extra hardware (i.e., parallel processors) might be needed for embodiments.

In the prior art bisection analysis, the number of simulations is one per iteration. Therefore, the number of simulations $S_b$ for bisection analysis is as follows:

$$S_b = N_b \tag{5}$$

For the quadsection analysis, there are three simulations per iteration. Therefore, for the quadsection analysis, the number of simulations $S_q$ is:

$$S_q = 3N_q \tag{6}$$

Combining equations (1), (3), (5) and (6) above results in $$S_q : S_b = 3:2 = 1.5 \tag{7}$$

Therefore, in comparison to the prior art bisection analysis, the quadsection analysis achieves 2× the convergence speed while increasing the hardware requirements by only 1.5×.

A disclosed, embodiments perform a setup or hold flip-flop timing analysis by dividing a window having an upper boundary ("pass edge") and a lower boundary ("fail edge") into four sections using three quadsection values/lines. Each value is simulated in parallel and the window is reduced based on which of the quadsection values pass or fail. Additional iterations of the quadsection analysis is implemented until the size of the window is less than a predetermined minimum window width. At that point, the optimized setup and hold time is the pass edge.

Several embodiments are specifically illustrated and/or described herein. However, it will be appreciated that modifications and variations of the disclosed embodiments are covered by the above teachings and within the purview of the appended claims without departing from the spirit and intended scope of the invention.

For example, in the embodiments disclosed above the search space/window is divided into four substantially equal sections. However, in other embodiments, the search space can be split into "n" number of substantially equal sections (3, 5, 6 . . . ), and the flow diagram of FIG. 4 can be modified accordingly.

What is claimed is:

1. A non-transitory computer readable medium having instructions stored thereon that, when executed by a processor, cause the processor to determine a timing for a flip-flop, the determining the timing comprising:

(1) generating a search window having a pass edge and a fail edge;
(2) dividing the search window into four sections using three quadsection values;
(3) for each of the quadsection values, simulating a timing analysis of the flip-flop and determine if each of the quadsection values pass or fail the analysis;
(4) if at least one of the quadsection values passes the analysis, causing one of the passed quadsection values to be a new pass edge for the search window;
(5) if at least one of the quadsection values fails the analysis, causing one of the failed quadsection values to be a new fail edge for the search window;
(6) if the search window is less than a predetermined window width, the new pass edge is the determined timing;
(7) if the search window is not less than the predetermined window width, repeating (2)-(7).

2. The computer readable medium of claim 1, wherein the determined timing is a setup time for the flip-flop.

3. The computer readable medium of claim 1, wherein the determined timing is a hold time for the flip-flop.

4. The computer readable medium of claim 1, wherein the simulating the timing analysis of the flip-flop for each of the quadsection values is performed approximately simultaneously for all quadsection values.

5. The computer readable medium of claim 4, wherein the processor comprises multiple cores adapted to execute instructions in parallel.

6. The computer readable medium of claim 4, wherein the processor comprises multiple processors adapted to execute instructions in parallel.

7. The computer readable medium of claim 1, wherein the four sections have an approximately equal width.

8. The computer readable medium of claim 1, wherein the flip-flop comprises a cell in a computer aided design tool.

9. A computer implemented method to determine a timing for a flip-flop, the method comprising:
  (1) generating by a processor a search window having a pass edge and a fail edge;
  (2) dividing by the processor the search window into four sections using three quadsection values;
  (3) for each of the quadsection values, simulating by the processor a timing analysis of the flip-flop and determining if each of the quadsection values pass or fail the analysis;
  (4) if at least one of the quadsection values passes the analysis, causing one of the passed quadsection values to be a new pass edge for the search window;
  (5) if at least one of the quadsection values fails the analysis, causing one of the failed quadsection values to be a new fail edge for the search window;
  (6) if the search window is less than a predetermined window width, assigning the new pass edge as the determined timing; and
  (7) if the search window is not less than the predetermined window width, repeating (2)-(7).

10. The method of claim 9, wherein the determined timing is a setup time for the flip-flop.

11. The method of claim 9, wherein the determined timing is a hold time for the flip-flop.

12. The method of claim 9, wherein the simulating the timing analysis of the flip-flop for each of the quadsection values is performed approximately simultaneously for all quadsection values.

13. A computer aided design system comprising:
a processor; and
a computer readable medium coupled to the processor;
wherein the processor, when executing instructions stored on the medium, generates a cell comprising a flip flop, and performs a timing analysis of the flip flop, the timing analysis comprising:
  (1) generating a search window having a pass edge and a fail edge;
  (2) dividing the search window into N sections using N−1 values, wherein N is three or greater;
  (3) for each of the values, simulating a timing analysis of the flip-flop and determining if each of the values pass or fail the analysis;
  (4) if at least one of the values passes the analysis, causing one of the passed values to be a new pass edge for the search window;
  (5) if at least one of the values fails the analysis, causing one of the failed values to be a new fail edge for the search window;
  (6) if the search window is less than a predetermined window width, assigning the new pass edge as a determined flip flop timing; and
  (7) if the search window is not less than the predetermined window width, repeating (2)-(7).

14. The system of claim 13, wherein the determined flip flop timing is a setup time for the flip-flop.

15. The system of claim 13, wherein the determined flip flop timing is a hold time for the flip-flop.

16. The system of claim 13, wherein the simulating the timing analysis of the flip-flop for each of the values is performed approximately simultaneously for all values.

17. The system of claim 16, wherein the processor comprises multiple cores adapted to execute instructions in parallel.

18. The system of claim 16, wherein the processor comprises multiple discrete processors adapted to execute instructions in parallel.

19. The system of claim 13, wherein the N sections have an approximately equal width.

* * * * *

UNITED STATES PATENT AND TRADEMARK OFFICE
CERTIFICATE OF CORRECTION

| | | |
|---|---|---|
| PATENT NO. | : 8,650,021 B2 | Page 1 of 1 |
| APPLICATION NO. | : 13/033961 | |
| DATED | : February 11, 2014 | |
| INVENTOR(S) | : Patra | |

It is certified that error appears in the above-identified patent and that said Letters Patent is hereby corrected as shown below:

Title page, Item 75 under Inventor, line 1, delete "Kashuk Patra" and insert -- Kaushik Patra --, therefor.

Title page, Item 73 under Assignee, line 2, delete "Redwood Shores" and insert -- Redwood Shores, CA (US) --, therefor.

Title page, column 2, under Other Publications, line 1, delete "Avant?;" and insert -- Avant!; --, therefor.

In the Specification:

In column 3, line 12, delete "window" and insert -- window. --, therefor.

In column 6, line 19, delete "A" and insert -- As --, therefor.

Signed and Sealed this
Twenty-fourth Day of June, 2014

Michelle K. Lee
*Deputy Director of the United States Patent and Trademark Office*